United States Patent
Wang

(10) Patent No.: US 11,394,818 B2
(45) Date of Patent: Jul. 19, 2022

(54) SYSTEM UPDATING METHOD AND DEVICE, AND STORAGE MEDIUM

(71) Applicant: BEIJING XIAOMI MOBILE SOFTWARE CO., LTD., Beijing (CN)

(72) Inventor: Qi Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 26 days.

(21) Appl. No.: 16/938,068

(22) Filed: Jul. 24, 2020

(65) Prior Publication Data

US 2021/0258420 A1    Aug. 19, 2021

(30) Foreign Application Priority Data

Feb. 19, 2020  (CN) .......................... 202010102668.2

(51) Int. Cl.
| | | |
|---|---|---|
| *H04M 1/725* | (2021.01) | |
| *H04M 1/72406* | (2021.01) | |
| *H04M 1/72463* | (2021.01) | |
| *G06F 8/65* | (2018.01) | |
| *G06F 11/36* | (2006.01) | |

(52) U.S. Cl.
CPC .......... *H04M 1/72406* (2021.01); *G06F 8/65* (2013.01); *G06F 11/368* (2013.01); *H04M 1/72463* (2021.01)

(58) Field of Classification Search
CPC .......... H04M 1/72406; H04M 1/72463; G06F 11/368; G06F 8/65
See application file for complete search history.

(56) References Cited

U.S. PATENT DOCUMENTS

| | | | | |
|---|---|---|---|---|
| 9,916,233 | B1 * | 3/2018 | Qureshi | G06F 8/70 |
| 10,399,706 | B1 * | 9/2019 | Hanlon | B64F 5/60 |
| 2014/0053125 | A1 * | 2/2014 | DeLuca | G06F 8/71 |
| | | | | 717/101 |
| 2015/0128259 | A1 * | 5/2015 | Suzuki | H04L 67/10 |
| | | | | 726/22 |
| 2016/0162275 | A1 * | 6/2016 | Morley | H04W 4/60 |
| | | | | 717/170 |
| 2020/0089594 | A1 * | 3/2020 | Zhou | G06F 11/3664 |

FOREIGN PATENT DOCUMENTS

| | | | |
|---|---|---|---|
| CN | 109634734 A | * | 4/2019 |
| CN | 110119350 A | * | 8/2019 |
| WO | WO 2018/113298 A1 | | 6/2018 |

OTHER PUBLICATIONS

Extended European Search Report dated Jan. 26, 2021 in corresponding European Patent Application No. 20190125.3 citing documents AA and AO therein, 40 pages.

* cited by examiner

*Primary Examiner* — Congvan Tran
(74) *Attorney, Agent, or Firm* — Oblon, McClelland, Maier & Neustadt, L.L.P.

(57) ABSTRACT

The present disclosure relates to a system updating method and device, and a storage medium. The method can include, in response to detecting a prompt for updating an operating system, determining whether there is an Application (APP) that is not compatible with the updated operating system in a mobile terminal. Further, the method can include in response to determining that there is the APP that is not compatible with the updated operating system in the mobile terminal, outputting first prompt information.

16 Claims, 10 Drawing Sheets

SYSTEM UPDATING METHOD AND DEVICE, AND STORAGE MEDIUM

CROSS-REFERENCE TO RELATED APPLICATION

This application is based upon and claims priority to Chinese Patent Application No. 202010102668.2, Filed on Feb. 19, 2020, the entire content of which is incorporated herein by reference.

TECHNICAL FIELD

The present disclosure relates to the technical field of electronic devices, and more particularly, to a system updating method and device, and a storage medium.

BACKGROUND

System update in terminals may improve user's experience, for example, some new functions can be obtained through the system update, existing functions are optimized, or terminal security is improved. Therefore, some users like to update a system at the first moment, while others set automatic update of the terminals.

However. Applications (APP) are usually installed in the terminals and after the system is updated, the APP may be unable to be used. This can negatively affect a user's experience.

SUMMARY

According to a first aspect of the present disclosure, a system updating method is provided that can be applied to a mobile terminal. The method may include that, in response to detecting a prompt for updating an operating system, it is determined whether there is an APP that is not compatible with the updated operating system in the mobile terminal. Further, the method can include that, in response to determining that there is the APP that is not compatible with the updated operating system in the mobile terminal, first prompt information can be output.

According to a second aspect of the present disclosure, a system updating method is provided that can be applied to a server. The method may include that an information acquisition instruction which is sent by a mobile terminal in response to detecting a prompt for updating an operating system is received and first application information is sent to the mobile terminal according to the information acquisition instruction. The first application information can be provided for the mobile terminal to determine whether there is an APP that is not compatible with the updated operating system in the mobile terminal.

According a third aspect of the present disclosure, a system updating device is provided, which may include a processor and a memory that is configured to store instructions executable by the processor. The processor can be configured to execute any system updating method in the first aspect or the second aspect.

According a fourth aspect of the present disclosure, a non-transitory storage medium is provided. When instructions in the storage medium are executed by a processor of a system updating device, the system updating device can execute any system updating method in the first aspect or the second aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
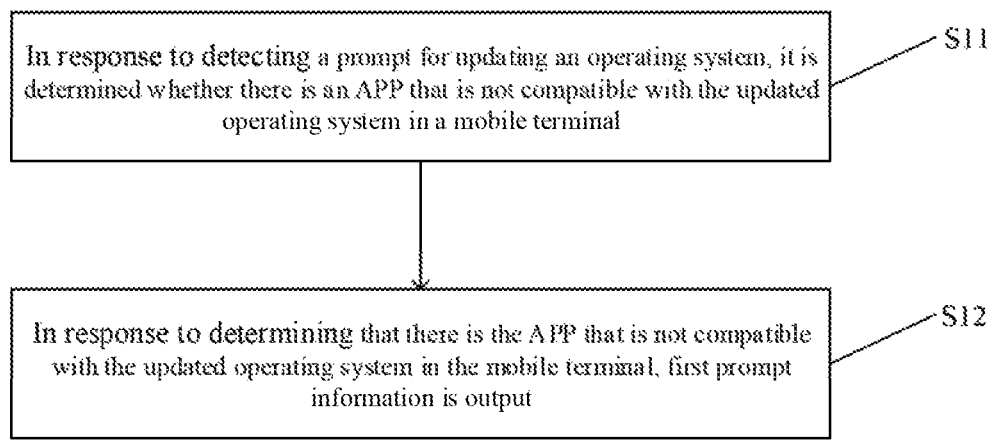
FIG. 1 is a first flow chart of a system updating method according to an embodiment of the present disclosure.

FIG. 1 is a first flow chart of a system updating method according to an embodiment of the present disclosure. As illustrated in FIG. 1, the system updating method which is applied to a mobile terminal may include the following steps.

In S11, in response to detecting a prompt for updating an operating system, it is determined whether there is an APP that is not compatible with the updated operating system in the mobile terminal.

In S12, in response to determining that there is the APP that is not compatible with the updated operating system in the mobile terminal, first prompt information is output.

In embodiments of the present disclosure, the mobile terminals can include a smart phone, a tablet PC, a smart game console, or the like. The mobile terminal is installed with an operating system, and any APP installed in the mobile terminal needs to be supported by the operating system to run. In the embodiments of the present disclosure, the operating system of the mobile terminal may be an Android system, and may also be an ios system or a Linux system. The operating system of the mobile terminal is not limited in/by the embodiment of tire present disclosure.

In S11, the prompt for updating the operating system which is detected by the mobile terminal may be a push message of prompting to update the operating system which is received by the mobile terminal from a system manufacturer. Taking Android phones, for example, Google updates the Android system every year, Android phones may receive the push message of prompting that the Android system may be updated from Google. When detecting the prompt for updating the operating system, the mobile terminal determines whether there is the APP that is not compatible with the updated operating system in the mobile terminal. Being not compatible means that the APP installed in the mobile terminal cannot be used normally in/under the updated operating system, for example, the APP fails to start, or some functions fail after starting.

In an embodiment, the operation that the mobile terminal determines whether there is the APP which is not compatible with the updated operating system may include that the mobile terminal determines by receiving a notification message actively sent by a server supporting the APP in the mobile terminal to run. Further, the operation that the mobile terminal determines whether there is the APP which is not compatible with the updated operating system may also include that the mobile terminal sends an inquiry message to the server supporting the APP to run, and receives a notification message returned by the server supporting the APP to run based on the inquiry message, and then the mobile terminal determines, according to the notification message, whether the APP is compatible with the updated operating system.

Exemplarily, taking the mobile terminal with the Android system for example, WeChat APP is installed in the mobile phone, and a server supporting the WeChat to run may send the notification message actively or send the notification message based on the inquiry message from the mobile terminal, so as to inform the phone that the WeChat is not compatible with the updated Android system.

In an embodiment, the mobile terminal may also determine the APP that is not compatible with the updated operating system according to a test server. Step S11 may include the following operations: when the prompt for updating the operating system is detected, an information acquisition instruction is sent to the server; first application information of the APP that is not compatible with the updated operating system is received, the first application information being fed back by the server based on the information acquisition instruction; it is detected whether second application information of the APP in the mobile terminal belongs to information in the first application information; and if the second application information belongs to the information in the first application information, it is determined that there is the APP that is not compatible with the updated operating system in the mobile terminal.

In the embodiment, the test server is different the server supporting the APP to run. The test server may interact with a plurality of test terminals to send a test instruction to each test terminal, so as to realize automatic testing of the APP installed in the test terminal. It is to be noted that the updated operating system is installed in each test terminal, a system adaptation test (system compatibility test) may be performed to the APP in the test terminal through the test server, and the information of the APP that is not compatible with the updated operating system in a test result may be stored in the first application information. Based on the first application information stored in the test server, the mobile terminal may send the information acquisition instruction to the server to acquire the first application information.

The mobile terminal compares, based on the acquired first application information, whether the second application information of the APP installed on it belongs to the information in the first application information; if so, it is indicated that there is the APP that is not compatible with the updated operating system in the mobile terminal.

The first application information or the second application information may be used for uniquely identifying the APP, and may include at least one of an icon of the APP, a package name of the APP, or a version number of the APP. For example, if the first application information received by the Android phone is {WeChatV3.0, MitoV2.0, MiliV4.0}, and the second application information of the APP in the phone is {MiliV4.0}, then the second application information can be matched with the first application information. The phone determines that "MiliV4.0" is the APP which is not compatible with the updated operating system. It is to be noted that, "Mili" belongs to the package name of the APP, and "V4.0" belongs to the version number of the APP. Other contents in the first application information may also be in the format and will not be detailed in the present disclosure.

If the mobile terminal determines that there is the APP which is not compatible with the updated operating system in the mobile phone in S11, the mobile phone outputs the first prompt information in S12 to prompt users whether to update the operating system. The first prompt information may include second application information belonging to the incompatible APP, and may also include risk prompt information to inform that the APP cannot be used normally if the operating system is updated. In the embodiments of the present disclosure, the first prompt information may be output in the form of voice broadcast or in the form of interface display, which is not limited by the embodiments of the present disclosure.

It should be understood that in the embodiment, the mobile terminal determines whether there is the APP that is not compatible with the updated operating system in the mobile terminal according to the first application information of the APP, which is not compatible with the updated operating system, stored in the test server. Because the test server is coupled with multiple test terminals to perform the system adaptation test for each APP in the application market, it is convenient for the test server to uniformly record die generated first application information, and it is convenient for the mobile terminal to determine whether to output the prompt information based on the first application information stored in the test server. Moreover, after the mobile terminal acquires the first application information from the test server, a comparison is performed on the mobile terminal to determine whether the mobile terminal has the incompatible APP, which reduces the occurrence of information leakage in the mobile terminals compared with the manner that the mobile terminal uploads the information of its own APP to the test server where the first application information is stored for comparison.

In another embodiment, the mobile terminal may also receive regularly or irregularly indication information, which indicates that the APP is not compatible with the updated operating system, sent from the server of the APP or the test server, and may locally determine according to the indication information whether there is the APP that is not compatible with the updated operating system in the mobile terminal.

In an embodiment, the system updating method may further include that a second updating instruction of/for updating the operating system which is fed back based on the first prompt information is received, and the operating system of the mobile terminal is updated according to the second updating instruction.

In the embodiment, after the mobile terminal receives the second updating instruction fed back by the users based on the first prompt information, the operating system may be updated according to the second updating instruction. The second updating instruction may be a voice control instruction or a user's click action instruction. Certainly, based on the output first prompt information, if the mobile terminal does not receive the second updating instruction of updating the operating system in the scheduled time, the mobile terminal does not update the operating system temporarily, but still runs with the operating system before update.

It should be understood that in the embodiments of the present disclosure, when detecting the prompt for updating the operating system, the mobile terminal determines whether there is the APP that is not compatible with the updated operating system in the mobile terminal, and outputs the first prompt information to prompt the user when there is the APP that is not compatible with the updated operating system. In this way, by outputting the first prompt information immediately rather than after the user updates the operating system when the prompt for updating the operating system is detected and it is determined that there is the APP that is not compatible with the updated operating system in the mobile terminal, an instant notification of an impact of an operating system update and the reasons for that impact can be provided, thus reducing the situation that the APP cannot be used after users unknowingly update the operating system, and improving user experience.

The first prompt information may be output in the form of voice broadcast or in the form of interface display. In an embodiment, when the first prompt information is output m the form of interface display, S12 may include that a display list including the APP that is not compatible with the updated operating system is displayed on a display screen of the mobile terminal. In the embodiment, the visual effect of the display may be improved in the form of the display list. For example, an icon of the APP that is not compatible with the updated operating system are displayed in the form of the display list, so as to make it easy for the user to quickly respond to these APPs, thus improving the user experience. It is to be noted that the display list may be displayed on the display screen by sliding, clicking or popping up a window, which is not limited by the embodiments of the present disclosure.

As mentioned above, in the embodiments of the present disclosure, based on the output first prompt information, the mobile terminal may determine whether to update the operating system or not. If the mobile terminal does not detect an operation for the first prompt information in the scheduled time after the first prompt information is output, the operating system is not updated by default, so as to reduce the impact that the APP cannot be used due to updating the operating system.

Figure 2:
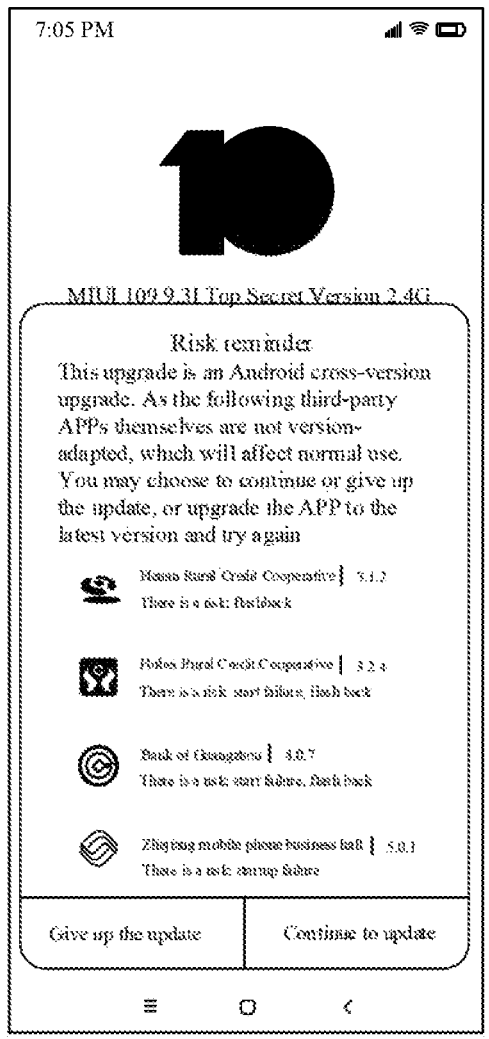
FIG. 2 is a display sample diagram of first prompt information according to the present disclosure.

FIG. 2 is a display sample diagram of first prompt information according to the present disclosure. As illustrated in FIG. 2, the APP that is not compatible with the updated operating system is displayed on the display screen of the mobile terminal in the form of the display list. The display list includes the icon of the APP, the package name of the APP and the version number of the APP, and also includes the risk prompt information. The icon of the APP, the package name of the APP, the version number of the APP and the risk prompt information all belong to the first prompt information. Moreover, controls, such as a "Give up the update" control and a "Continue to update" control, associated with the update services are also in the display list, so as to make it easy for the user to decide whether to update.

In an embodiment, the operation that the display list including the APP that is not compatible with the updated operating system is displayed on the display screen of the mobile terminal may include that: the display list including the APP that is not compatible with the updated operating system is displayed on the display screen of the mobile terminal in a form of a pop-up window. Displaying the display list in the form of a pop-up window can reduce operations of the user, and warning can be enhanced by means of dynamic pop-up.

Figure 3:
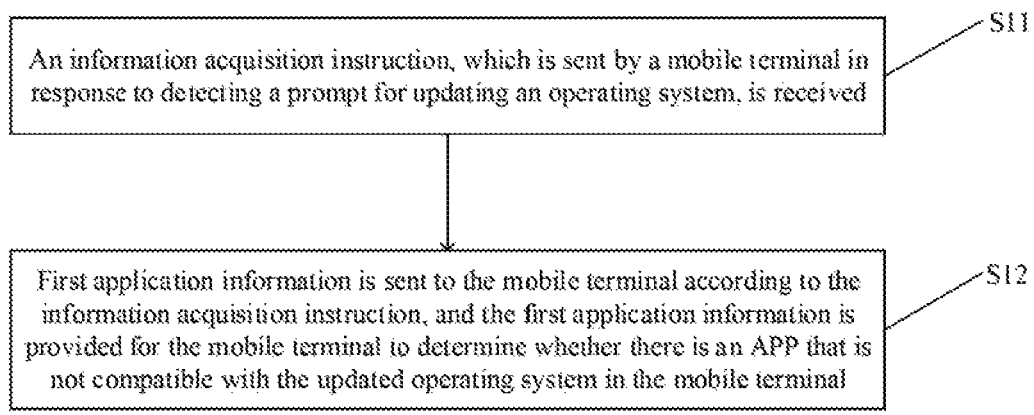
FIG. 3 is a second flow chart of a system updating method according to an embodiment of the present disclosure.

FIG. 3 is a second flow chart of a system updating method according to an embodiment of the present disclosure. As illustrated in FIG. 3, the system updating method which is applied to a server may include the following steps.

In S21, an information acquisition instruction, which is sent by a mobile terminal in response to detecting a prompt for updating an operating system, is received.

In S22, first application information is sent to the mobile terminal according to the information acquisition instruction. The first application information is provided/used for the mobile terminal to determine whether there is an APP that is not compatible with the updated operating system in the mobile terminal.

In the embodiment, the server may be either a server supporting the APP in the mobile terminal to run, or a test server independent of each APP. The test server is a server that may perform a system adaptation test to the APP, namely testing whether each APP is compatible with the updated operating system. The test server or the server supporting the APP in the mobile terminal to run may receive the information acquisition instruction in S21, and sends the first application information to the mobile terminal according to the information acquisition instruction in S22.

It is to be noted that the first application information is information including the APP that is not compatible with the updated operating system, and is provided for the mobile terminal to determine whether there is the APP that is not compatible with the updated operating system. In an embodiment, if the server is the one supporting a certain APP in the mobile terminal to run, the first application information is the information belonging to the APP. In another embodiment, if the server is the test server, the first application information is an information set belonging to each APP.

In the embodiment, the server receives the information acquisition instruction which is sent by the mobile terminal when detecting the prompt for updating the operating system, and sends the first application information to the mobile terminal according to the information acquisition instruction, so as to make it easy for the mobile terminal to check whether there is the APP that is not compatible with the updated operating system. In this way, it is convenient for the mobile terminal to inform customers by outputting the first prompt information when the prompt for updating the operating system is detected and it is determined that there is the APP that is not compatible with the updated operating system in the mobile terminal, instead of prompting an impact of the operating system update and the reasons for that impact after the user updates the operating system, thus reducing the situation that the APP cannot be used after users unknowingly update the operating system, and improving user experience.

Figure 4A:
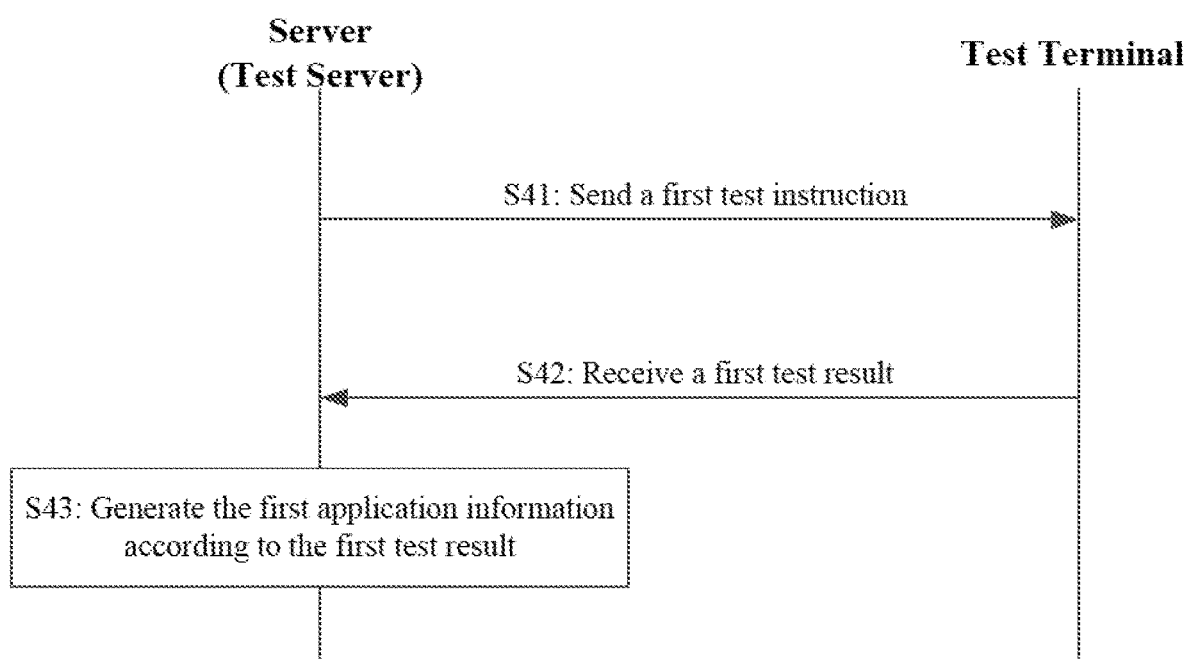
FIGS. 4A-4C are interaction sample diagrams of a system updating method according to one or more embodiments of the present disclosure.

Further, if the server is a test server, the system updating method may further include that a first test instruction is sent to a test terminal (S41 in FIG. 4A); a first test result which is fed back by the test terminal after testing an APP in the test terminal according to the first test instruction is received (S42 in FIG. 4A), the test terminal being installed with the updated operating system, and the first application information is generated according to information of the APP that is not compatible with the updated operating system in the first test result (S43 in FIG. 4A).

In the embodiment, the operating system of the test terminal is the updated operating system, the test terminal is installed with the APP, and different test terminals may be installed with multiple APPs in the application market. The server sends the first test instruction to the test terminal by coupling with multiple test terminals. The first test instruction is used by multiple test terminals to test system compatibility of their respective APPs and to feed back the first test result to the server. The server selects the information of the APP that is not compatible with the updated operating system according to the first rest result to generate the first application information.

It should be understood that in the embodiment, by coupling with the test terminal and sending the first test instruction to the test terminal, the test server determines the APP that is not compatible with the updated operating system based on a compatibility test result of the test terminal, and generates the first application information, which facilitates the test server to record the generated first application information.

It is to be noted that in the embodiments of the present disclosure, the generation of the first application information is not limited to the above manners. For example, the first application information may also be generated by receiving information input manually (by the mobile phone manufacturer) through a client.

Figure 4B:
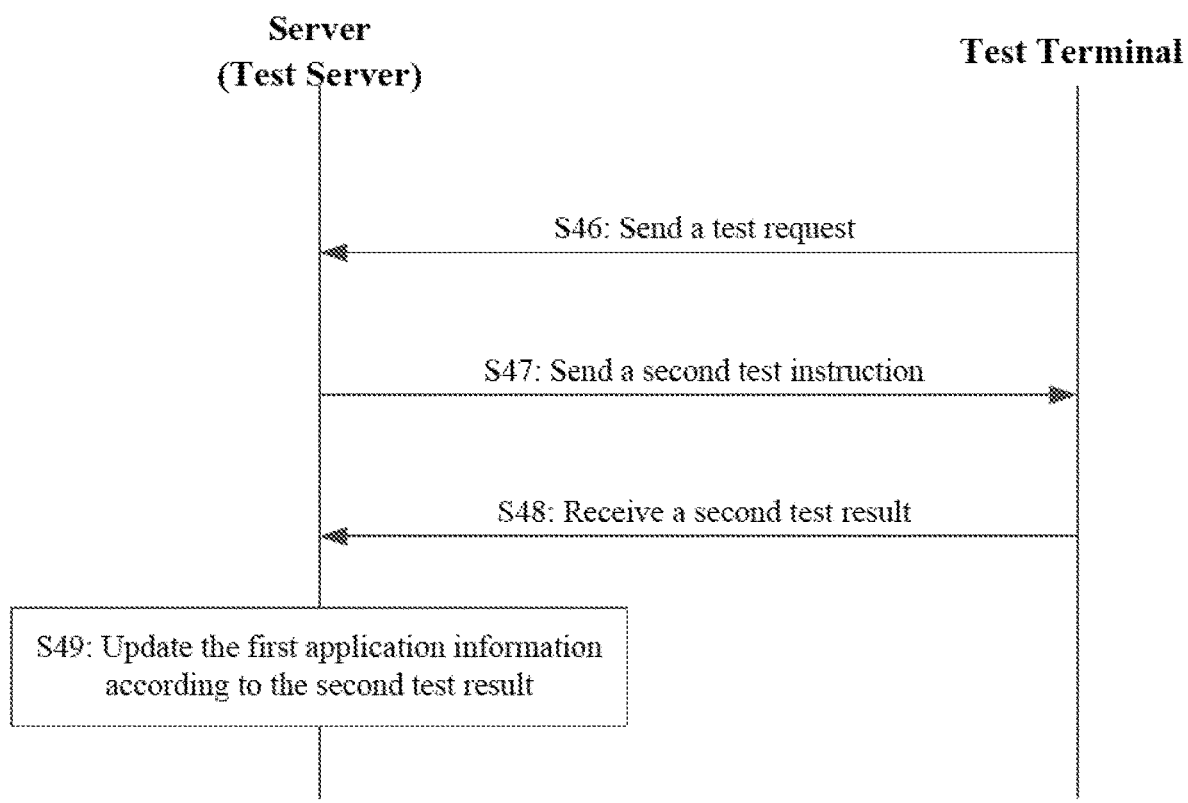

In an embodiment, the system updating method may further include that: a test request is received, and the test request is sent by the test terminal after detecting an operation of updating the APP in the test terminal and includes information of the updated APP (S46 in FIG. 4B); a second test instruction is sent to the test terminal according to the test request (S47 in FIG. 4B); a second test result which is fed back by the test terminal after testing the updated APP according to the second test instruction is received (S48 in FIG. 4B); and the information of the updated APP that is compatible with the updated operating system in the second test result is deleted from the first application information (S49 in FIG. 4B).

In the embodiment, after detecting the operation of updating the APP, the test terminal may also send the test request to the test server. The test request includes the information of the updated APP. After receiving the test request, the test server may send the second test instruction to the test terminal which sends the test request. The second test instruction is used by the test terminal to test the system compatibility of the updated APP and to feed back the second test result to the server. The server selects the information of the APP that is compatible with the updated operating system according to the second rest result, and deletes the information from the first application information.

It should be understood that the server side may not only initiate the system compatibility test for all the APPs in each test terminal, but also specifically test the updated APP based on the request of the test terminal, so as to update the first application information in this way, the first application information is updated without needing the test server to repeatedly start the compatibility test for all the APPs, which improves the efficiency of acquiring the first application information in the server.

Moreover, it is to be noted that in the embodiments of the present disclosure, the update of the first application information is not limited to the above manners. For example, the first application information may also be updated by receiving information input manually (by the mobile phone manufacturer) through a client.

Figure 4C:
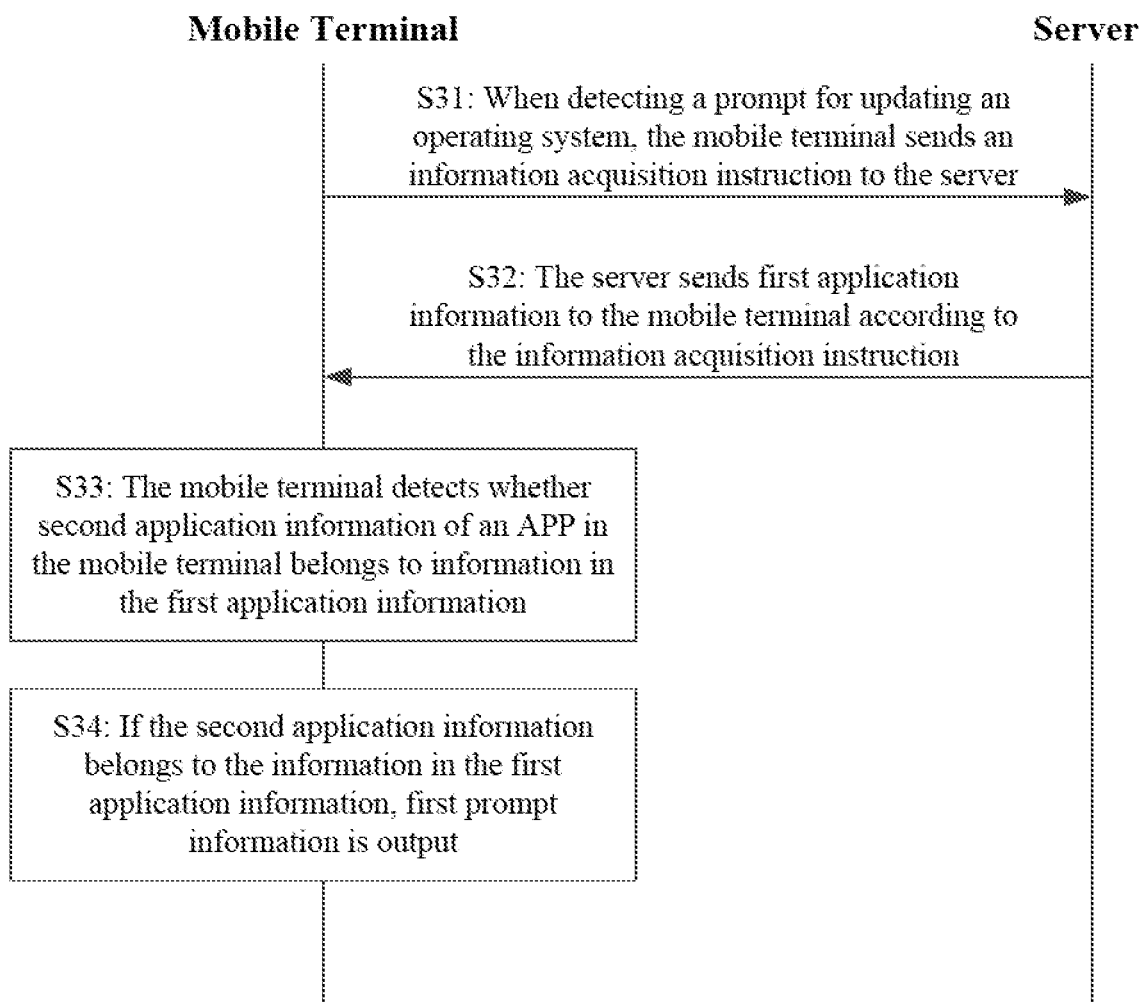

FIG. 4C is an interaction sample diagram of a system updating method according to embodiment of the present disclosure. As illustrated in FIG. 4C, the system updating method which is applied to the mobile terminal and the server may include the following steps.

In S31, when detecting a prompt for updating an operating system, the mobile terminal sends an information acquisition instruction to the server.

In S32, the server sends first application information to the mobile terminal according to the information acquisition instruction.

In S33, the mobile terminal detects whether second application information of an APP in the mobile terminal belongs to information in the first application information.

In S34, if the second application information belongs to the information in the first application information, first prompt information is output.

In the embodiments of the present disclosure, when detecting the prompt for updating the operating system, the mobile terminal sends the information acquisition instruction to the server and receives the first application information fed back by the server based on the information acquisition instruction. Then, when determining based on the first application information that there is the APP which is not compatible with the updated operating system, the mobile terminal outputs the first prompt information to prompt the user, in this way, by outputting the first prompt information immediately rather than after the user updates the operating system when the prompt for updating the operating system is detected and it is determined that there is the APP that is not compatible with the updated operating system in the mobile terminal, an instant notification of an impact of an operating system update and the reasons for that impact can be provided, thus reducing the situation that the APP cannot be used after users unknowingly update the operating system, and improving user experience.

Figure 5:
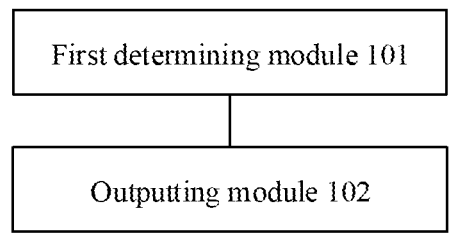
FIG. 5 is a first diagram of a system updating device according to an exemplary embodiment.

FIG. 5 is a first diagram of a system updating device according to an exemplary embodiment. Referring to FIG. 5, the system updating device applied to the mobile terminal may include: a first determining module 101 and an outputting module 102.

The first determining module 101 is configured to determine, in response to detecting a prompt for updating an operating system is detected, whether there is an APP that is not compatible with the updated operating system in the mobile terminal. The outputting module 102 is configured to output first prompt information in response to determining that there is the APP that is not compatible with the updated operating system in the mobile terminal.

Optionally, the first determining module 101 is specifically configured to send an information acquisition instruction to a server in response to detecting the prompt for updating the operating system, and receive first application information of the APP that is not compatible with the updated operating system, the first application information being fed back by the server based on the information acquisition instruction. The first determining module can further be configured to detect whether second application information of the APP in the mobile terminal belongs to information in the first application information, and, in response to the second application information belonging to the information in the first application information, determine that there is the APP that is not compatible with the updated operating system in the mobile terminal.

The outputting module 102 can specifically be configured to display a display list including the APP that is not compatible with the updated operating system on a display screen of the mobile terminal. Further, the outputting module 102 can be specifically configured to display, on the display screen of the mobile terminal, the display list including the APP that is not compatible with the updated operating system in a form of a pop-up window.

Optionally, the device may further include a first receiving module 103 and a first updating module 104. The first receiving module 103 is configured to receive a second updating instruction of updating the operating system which is fed back based on the first prompt information. The first updating module 104 is configured to update the operating system of the mobile terminal according to the second updating instruction.

Figure 6:
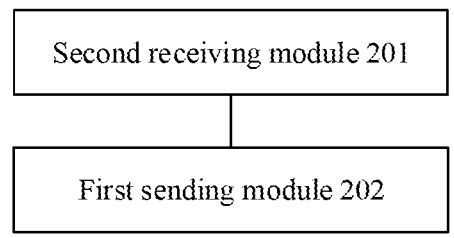
FIG. 6 is a second diagram of a system updating device according to an exemplary embodiment.

FIG. 6 is a second diagram of a system updating device according to an exemplary embodiment. Referring to FIG. 6, the system updating device applied to the server may include: a second receiving module 201 and a first sending module 202. The second receiving module 201 is configured to receive an information acquisition instruction which is sent by a mobile terminal in response to detecting a prompt for updating an operating system. The first sending module 202 is configured to send first application information to the mobile terminal according to the information acquisition instruction. The first application information is provided for the mobile terminal to determine whether there is an APP that is not compatible with the updated operating system in the mobile terminal.

Optionally, the device may further include: a second sending module 203, a third receiving module 204 and a generating module 205. The second sending module 203 is configured to send a first test instruction to a test terminal. The third receiving module 204 is configured to receive a first test result which is fed back by the test terminal after testing an APP in the test terminal according to the first test instruction. The test terminal is installed with the updated operating system. The generating module 205 is configured to generate the first application information according to information of the APP that is not compatible with the updated operating system in the first test result.

Additionally, the device may further include a fourth receiving module 206, a third sending module 207, a fifth receiving module 208 and a second updating module 209. The fourth receiving module 206 is configured to receive a test request. The test request is sent by the test terminal after detecting an operation of updating the APP in the test terminal, and includes information of the updated APP. The third sending module 207 is configured to send a second test instruction to the test terminal according to the test request. The fifth receiving module 208 is configured to receive a second test result which is fed back by the test terminal after testing the updated APP according to the second test instruction. The second updating module 209 is configured to delete the information of the updated APP that is compatible with the updated operating system in the second test result from the first application information.

With regard to the device in the above embodiments, the specific mode of each module performing operations has been described in detail in the embodiments of the method, so it will not be repealed here.

Figure 7:
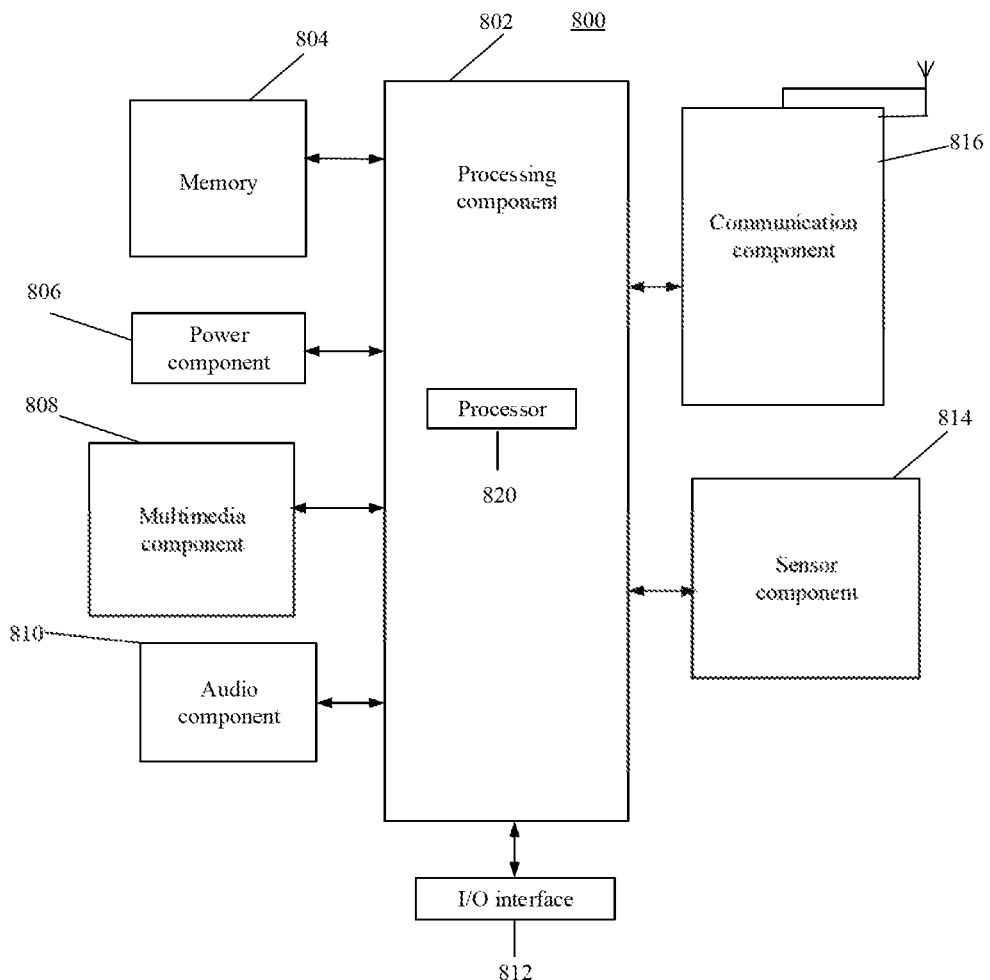
FIG. 7 is a block diagram of a mobile terminal according to an embodiment of the present disclosure.

FIG. 7 is a block diagram of a mobile terminal device 800, according to an exemplary embodiment. For example, the device 800 may be a mobile phone, a mobile computer, and the like.

Referring to FIG. 7, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any APPs or methods operated on the device 800, contact data, phonebook data, messages, pictures, video, and the like. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a period of time and a pressure associated with the touch or swipe action. In some embodiments, the multimedia component 808 includes a front camera and/or a rear camera. The front camera and or the rear camera may receive external multimedia data when the device 800 is in an operation mode, such as a photographing mode or a video mode. Each of the from camera and the rear camera may be a fixed optical lens system or have focusing and optical zooming capabilities.

The audio component 810 is configured to output and or input an audio signal. For example, the audio component 810 includes a microphone (MIC), and the MIC is configured to receive an external audio signal when the device 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to: a home button, a volume button, a starting button, and a locking button.

The sensor component 814 includes one or more sensors configured to provide status assessments in various aspects for the device 800. For instance, the sensor component 814 may detect an on off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other devices. The device 800 may access a communication-standard-based wireless network, such as a wireless fidelity (WiFi) network, a 2nd-generation (2G) or 3rd-generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above method.

In an exemplary embodiment, there is also provided a non-transitory computer-readable storage medium including instructions, such as included in the memory 804, executable by the processor 820 of the device 800 to implement the abovementioned methods. For example, the non-transitory computer-readable storage medium may be a read-only memory (ROM), a random access memory (RAM), a compact disc read-only memory (CD-ROM), a magnetic tape, a floppy disc, an optical data storage device, and the like.

A non-transitory computer-readable storage medium is provided. When instructions in the storage medium are executed by a processor of a mobile terminal, the mobile terminal can execute a system updating method. The method includes that; in response to detecting a prompt for updating an operating system, it is determined whether there is an APP that is not compatible with the updated operating system in the mobile terminal; in response to determining that there is the APP that is not compatible with the updated operating system in the mobile terminal, first prompt information is output.

Figure 8:
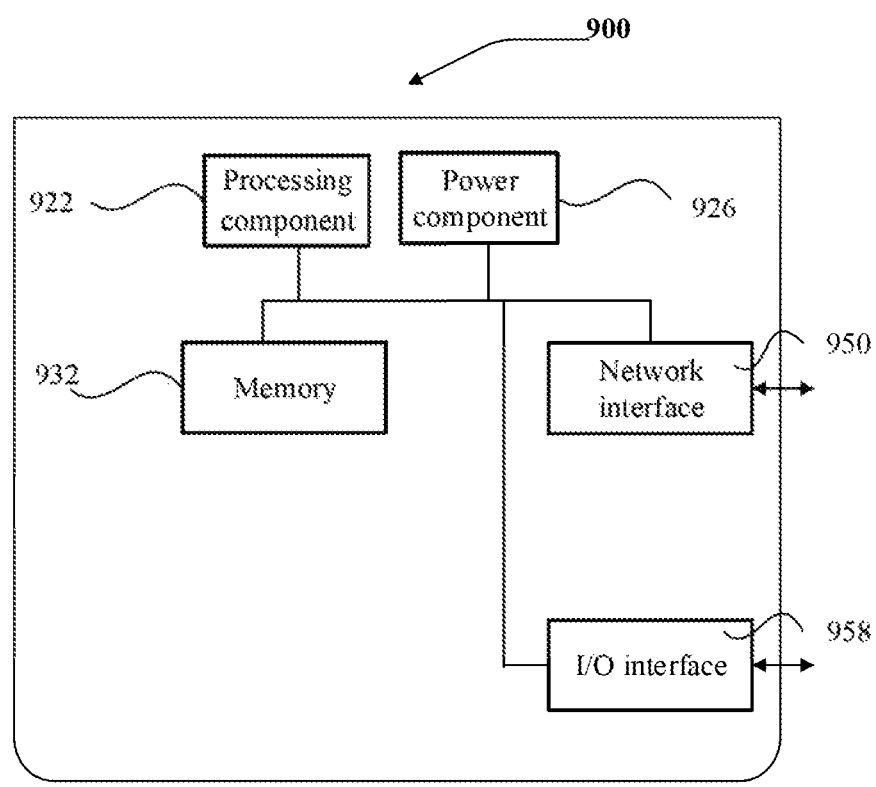
FIG. 8 is a block diagram of a server according to an embodiment of the present disclosure.

FIG. 8 is a block diagram of a server device 900 according to an exemplary embodiment. Referring to FIG. 8, the device 900 includes a processing component 922, further including one or more processors, and a memory resource represented by a memory 932, configured to store instructions executable by the processing component 922, for example, an APP. The APP stored in the memory 932 may include one or more than one module of which each corresponds to a set of instructions. In addition, the processing component 922 is configured to execute the instructions to implement the abovementioned system updating methods.

The device 900 may further include a power component 926 configured to execute power management of the device 900, a wired or wireless network interface 950 configured to connect the device 900 to a network and an I/O interface 958. The device 900 may be operated based on an operating system stored in the memory 932, for example, Windows Server™, Max OS X™, Unix™, Linux™, FreeBSD™, or the like.

In an exemplary embodiment, there is also provided a non-transitory computer-readable storage medium including instructions, such as included in the memory 932, executable by the processing component 922 of the device 900 to implement the abovementioned methods. For example, the non-transitory computer-readable storage medium may be a ROM, a RAM, a CD-ROM, a magnetic tape, a floppy disc, an optical data storage device, and the like.

A non-transitory computer-readable storage medium is provided. When instructions in the storage medium are executed by a processing component of a server, the server can perform a system updating method. The method may include that an information acquisition instruction which is sent by a mobile terminal when detecting a prompt for updating an operating system is received, and first application information is sent to the mobile terminal according to the information acquisition instruction, the first application information being provided for the mobile terminal to determine whether there is an APP that is not compatible with the updated operating system in the mobile terminal.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A system updating method that is applied to a mobile terminal, comprising:

determining whether there is au Application (APP) that is in the mobile terminal and incompatible with an updated operating system in response to detecting a prompt for updating the mobile terminal according to the updated operating system; and outputting first prompt information in response to determining that there is the APP that is in the mobile terminal and incompatible with the updated operating system, wherein the determining whether there is the APP that is in the mobile terminal and incompatible with the updated operating system comprises:

sending an information acquisition instruction to a test server in response to detecting the prompt for updating the mobile terminal according to the updated operating system;

receiving first application information identifying, at least a reported APP that is not compatible with the updated operating system, the first application information being fed back by the test server in response to the information acquisition instruction;

determining whether a matched APP that is identified by both the first application information and second application information exists, the second application information identifying one or more APPS in the mobile terminal; and determining that the matched APP is the APP that is in the mobile terminal and incompatible with the updated operating system in response to the matched APP being determined as existing, and wherein the test server is different from a supporting server configured to support execution of the reported APP, the test server interacting with test terminals in which the updated operating system is installed, a system compatibility test being performed to the reported APP in the test terminals through the test server, and information of the reported APP that is incompatible with the updated operating system in a test result is stored in the first application information.

2. The method of claim 1, wherein outputting the first prompt information further comprises:

displaying a display list including the APP that is incompatible with the updated operating system on a display screen of the mobile terminal.

3. The method of claim 2, wherein displaying the display list including the APP that is incompatible with the updated operating system on the display screen of the mobile terminal further comprises:

displaying, on the display screen of the mobile terminal, the display list including the APP that is incompatible with the updated operating system in a form of a pop-up window.

4. The method of claim 1, further comprising:

receiving a second updating instruction of updating the mobile terminal according to the updated operating system which is fed back based on the first prompt information; and updating the mobile terminal according to the updated operating system in response to the second updating instruction.

5. A non-transitory computer-readable storage medium including instructions that, when executed by a processor of a device, causes the device to implement the system updating method of claim 1.

6. A system updating method that is applied to a test server, comprising:

receiving an information acquisition instruction which is sent by a mobile terminal in response to detecting a prompt for updating the mobile terminal according to an updated operating system; and sending first application information to the Mobile terminal in response to the information acquisition instruction, the first application information being provided for the mobile terminal to determine whether there is an Application (APP) that is in the mobile terminal and not compatible with the updated operating system, wherein the test server is different from a supporting server configured to support execution of a tested APP, the test server interacting with test terminals in which the updated operating system is installed, a system compatibility test being performed to the tested APP in the test terminals through the test server, and information of the tested APP that is incompatible with the updated operating system in a test result is stored in the first application information.

7. The method of claim 6, further comprising:

sending a first test instruction to one of the test terminals;

receiving a first test result which is feel back by the one of the test terminals after testing the tested APP in the one of the test terminals according to the first test instruction, the one of the test terminals being installed with the updated operating system; and generating the first application information according to information of the tested APP that is incompatible with the updated operating system in the first test result.

8. The method of claim 7, further comprising:

receiving a test request, the test request being sent by the one of the test terminals after detecting an operation of updating the tested APP in the one of the test terminals to an updated APP and including information of the updated APP;

sending a second test instruction to the one of the test terminals according to the test request;

receiving a second test result which is fed back by the one of the test terminals after testing the updated APP according to the second test instruction; and updating the first application information in response to the second test result indicating that the updated APP is compatible with the updated operating system.

9. A non-transitory computer-readable storage medium including instructions that, when executed by a processor of a device, causes the device to implement the system updating method of claim 6.

10. A mobile terminal, comprising:

a processor; and a memory for storing instructions executable by the processor;

wherein the processor is configured to:

determine whether there is an Application (APP) that is in the mobile terminal and incompatible with an updated operating system in response to detecting a prompt for updating the mobile terminal according to the updated operating system; and output first prompt information in response to determining that there is the APP that is in the mobile terminal and incompatible with the updated operating system, wherein the processor is further configured to:

send an information acquisition instruction to a test server in response to detecting the prompt for updating the mobile terminal according to the updated operating system;

receive first application information identifying at least a reported APP that is not compatible with the updated operating system, the first application information being fed back by the test server in response to the information acquisition instruction;

determine whether a matched APP that is identified by both the first application information and second application formation exists, the second application information identifying one or more APPs in the mobile terminal; and determine that the matched APP is the APP that is in the mobile terminal and incompatible with the updated operating system in response to the matched APP being determined as existing, and wherein the test server is different from a supporting server configured to support execution of the reported APP, the test server interacting with test terminals in which the updated operating system is installed, a system compatibility test being performed to the reported APP in the test terminals through the test server, and information of the reported APP that is incompatible with the updated operating system in a test result is stored in the first application information.

11. The mobile terminal of claim 10, wherein the processor is further configured to display a display list including the APP that is incompatible with the updated operating system on a display screen of the mobile terminal.

12. The mobile terminal of claim 11, wherein the processor is further configured to display, on the display screen of the mobile terminal, the display list including the APP that is incompatible with the updated operating system in a form of a pop-up window.

13. The mobile terminal of claim 9, wherein the processor is further configured to:
receive a second updating instruction of updating the mobile terminal according to the updated operating system which is fed back based on the first prompt information; and
update the mobile terminal according to the updated operating system in response to the second updating instruction.

14. A test server comprising:
a processor; and
a memory for storing instructions executable by the processor;
wherein the processor is configured to:
receive an information acquisition instruction which is sent by a mobile terminal in response to detecting a prompt for updating the mobile terminal according to an updated operating system; and
send first application information to the mobile terminal in response to the information acquisition instruction, the first application information being provided for the mobile terminal to determine whether there is an Application (APP) that is in the mobile terminal and incompatible with the updated operating system,
wherein the test server is different from a supporting server configured to support execution of a tested APP, the test server interacting with test terminals in which the updated operating system is installed, a system compatibility test being performed to the tested APP in the test terminals through the test server, and information of the tested APP that is incompatible with the updated operating system in a test result is stored in the first application information.

15. The test server of claim 14, wherein the processor is further configured to:
send a first test instruction to one of the test terminals;
receive a first test result which is fed back by the one of the test terminals after testing the tested APP in the one of the test terminals according to the first test instruction, the one of the test terminals being installed with the updated operating system; and
generate the first application information according to information of the tested APP that is incompatible with the updated operating system in the first test result.

16. The test server of claim 15, wherein the processor is further configured to:
receive a test request, the test request being sent by the one of the test terminals after detecting an operation of updating the tested APP in the one of the test terminals to an updated APP and including information of the updated APP;
send a second test instruction to the one of the test terminals according to the test request;
receive a second test result which is fed back by the one of the test terminals after testing the updated APP according to the second test instruction; and
update the first application information in response to the second test result indicating that the updated APP is compatible with the updated operating system.

* * * * *